(12) United States Patent
Hubel et al.

(10) Patent No.: US 7,858,829 B2
(45) Date of Patent: Dec. 28, 2010

(54) ALKOXYLATIONS IN MICROSTRUCTURED CAPILLARY REACTORS

(75) Inventors: Roland Hubel, Essen (DE); Georg Markowz, Karlstein (DE); Manfred Recksik, Essen (DE); Markus Rudek, Frankfurt am Main (DE); Dietmar Wewers, Bottrop (DE); Florian Zeller-Schuldes, Erlensee (DE)

(73) Assignee: Evonik Goldschmidt GmbH (DE)

( * ) Notice: Subject to any disclaimer, the term of this patent is extended or adjusted under 35 U.S.C. 154(b) by 1338 days.

(21) Appl. No.: 11/083,172

(22) Filed: Mar. 17, 2005

(65) Prior Publication Data
US 2005/0245628 A1 Nov. 3, 2005

(30) Foreign Application Priority Data
Mar. 19, 2004 (DE) .......... 10 2004 013 551

(51) Int. Cl.
*C07C 41/03* (2006.01)
*B01J 10/00* (2006.01)
(52) U.S. Cl. .......... 568/620; 568/679; 568/680
(58) Field of Classification Search .......... None
See application file for complete search history.

(56) References Cited

U.S. PATENT DOCUMENTS

| 5,364,973 | A | * | 11/1994 | Pazos | .......... 568/620 |
|---|---|---|---|---|---|
| 5,690,763 | A | * | 11/1997 | Ashmead et al. | .......... 156/60 |
| 5,723,094 | A | * | 3/1998 | Sunavala | .......... 422/197 |
| 5,811,062 | A | * | 9/1998 | Wegeng et al. | .......... 422/129 |
| 2004/0141893 | A1 | * | 7/2004 | Martin | .......... 422/198 |
| 2005/0009175 | A1 | * | 1/2005 | Bergh et al. | .......... 435/287.2 |
| 2006/0142401 | A1 | * | 6/2006 | Tonkovich et al. | .......... 518/726 |
| 2009/0074627 | A1 | * | 3/2009 | Fitzgerald et al. | .......... 422/129 |

FOREIGN PATENT DOCUMENTS

| DE | 41 28 827 A1 | 3/1993 |
|---|---|---|
| DE | 100 36 602 A1 | 2/2002 |
| DE | 100 54 462 A1 | 6/2002 |
| EP | 0 419 419 A1 | 3/1991 |

\* cited by examiner

*Primary Examiner*—Rosalynd Keys
(74) *Attorney, Agent, or Firm*—Frommer Lawrence & Haug LLP

(57) ABSTRACT

The invention relates to a process and to an apparatus for preparing polyether alcohols by alkoxylating alcohols, and also long-chain polyether alcohols having a narrow product distribution. The process is preferably carried out continuously in the liquid phase in a microstructured reactor. An alkylene oxide or different alkylene oxides are metered at one or more points into the channels of the microreactor. The channels are cooled with the aid of a cooling medium or heated with the aid of a heating medium.

22 Claims, 6 Drawing Sheets

ALKOXYLATIONS IN MICROSTRUCTURED CAPILLARY REACTORS

FIELD OF THE INVENTION

The invention relates to a process and to an apparatus for preparing polyether alcohols by alkoxylating alcohols, and also long-chain polyether alcohols having a narrow molecular mass distribution.

BACKGROUND OF THE INVENTION

Polyether alcohols are important feedstocks in polyurethane foam preparation and the production of substances having interface-influencing properties. Polyether alcohols are prepared usually by ring-opening addition of short-chain alkylene oxides such as ethylene oxide, propylene oxide, butylene oxide, dodecene oxide and/or styrene oxide to low molecular weight alcohols such as butanol and/or allyl alcohol. The catalysts used are usually metallic hydroxides or salts, potassium hydroxide having the greatest practical significance.

The reaction with ethylene oxide proceeds according to the following scheme:

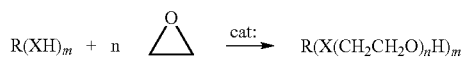

XH refers in the widest sense to H-functional groups on an organic radical R, and RXH is generally present as ROH (alcohol). Alcohols shall also refer hereinbelow to other H-functional substances (RXH where X=O, S, NH or NR' where R' is an organic, cyclic or acyclic, optionally substituted radical having from 1 to 18 carbon atoms). However, the alcohols where X=O have gained the greatest signficance in practice as starting substances in the alkoxylation. Frequently, the initially charged alcohol is reacted initially with a base such as KOH to give the corresponding alkoxide and, after removal of the water of reaction formed, the alkoxide is reacted with ethylene oxide. In the present case, the catalyst remains in the reaction mixture as a reactive component and optionally likewise functions as a starter molecule.

When the base is added, an equilibrium forms between alcohol/base and alkoxide/corresponding acid:

The corresponding acid may either remain in the system or else be removed distillatively. When the corresponding acid remains in the system, the base is also alkoxylated. At this point, there is an equilibrium, so that both polyethers of the starter alcohol via the stage of the polyether alkoxide and polyethers of the corresponding base or of the polyether which has already formed from the reaction of the base with alkylene oxide are formed.

The products are mixtures of homologs of the particular starter molecule of different chain length. A significant problem in the alkoxylation is that a large amount of the monomers which have not yet reacted is present in the reactor during the reaction and thus constitutes an increased safety risk. Furthermore, in the batchwise operating mode, the reactor has to be completely emptied, cleaned and charged again in the event of a product change before a new product can be prepared.

In the batchwise operating mode, the product remains in the reactor usually for between 1 and 30 hours, preferably between 3 and 10 hours, so that undesired by-products result. In the case of allyl alcohol-started polymerizations, there is a rearrangement of allyl ether formed during the reaction to the propenyl ether. Furthermore, when propylene oxide is used as a monomer, a rearrangement of the propylene oxide to the allyl alcohol occurs, which functions as a new starter alcohol and influences the composition of the end product and the molecular mass distribution.

In the case of long-chain polyethers, long residence times at high reaction temperatures result in the elimination of water at the chain end and thus in the formation of vinyl ether derivatives. The water formed functions as a starter molecule and increases the proportion of diols in the product.

Polyethers are prepared in industry generally by two different process principles.

In the first process principle, the alkoxylation is carried out in a stirred reaction which is heatable and coolable. The alcohol to be alkoxylated is initially charged together with the catalyst in the stirred vessel and heated. Subsequently, alkylene oxide is metered into the reactor and the vessel contents are mixed with a stirrer. The alkylene oxide is metered under pressure and temperature control. Since the reaction is very rapid and exothermic, intensive cooling is required. This is effected in the case of stirred reactors by an external cooling jacket and/or by internal cooling coils. After the reaction, the reactor is decompressed and unconverted alkylene oxide is removed by applying reduced pressure. The catalyst is neutralized with acid and the resulting salts are filtered off. If appropriate, the resulting salts also remain in the polyether.

In the second process principle, as laid out in EP-A-0 419 419, the alkoxylation is carried out in a loop reactor. To this end, the alcohol to be alkoxylated is initially charged together with the catalyst in a vessel and circulated by pumping through a pump and pipeline. The heat is removed with the aid of an external heat exchanger which is installed in the pump circulation pipeline.

The temperatures during the reaction in both process principles are in the range from about 50 to about 220° C., preferably from about 110 to about 180° C. The pressure is preferably from about 2 to about 40 bar, preferably from about 3 to about 6 bar. The degree of alkoxylation is established by the ratio of alcohol to alkylene oxide and is limited essentially by the construction of the reaction. The duration of the reaction depends upon the reactor size, the effectiveness of the cooling equipment, how well the reactants are mixed and the nature of the desired product. In general, the duration is several hours.

In practice, alkoxylations are carried out batchwise, which leads to variations in quality.

A significant problem is the spontaneous decomposition of ethylene oxide in the gas phase. To prevent this, the ethylene oxide concentration in the gas space of the reactor is reduced with inert gases, for example nitrogen. This forms additional amounts of off gas on decompression of the reactor, and the achievable degree of alkoxylation or the batch size are adversely affected.

As a consequence of the large holdup in the batchwise preparation, relatively large amounts of unreacted alkylene oxides can be collected, which can lead to the reaction becoming uncontrollable.

The batchwise stirred and loop reactors of the prior art a re restricted by a minimum and maximum fill level which in turn limits the achievable degree of alkoxylation. High degrees of alkoxylation therefore entail a plurality of batch reactors connected in series or the use of product precursors, which is very costly and inconvenient.

The literature therefore already describes continuous processes for alkoxylation which are intended to avoid the abovementioned disadvantages.

DE-A-41 28 827 describes a process for the catalyzed alkoxylation of fat derivatives in a falling-film reactor, in which the alkylene oxide in gaseous form is contacted with the liquid in cocurrent. Advantages are a low content of by-products and high safety owing to the very small amount of alkylene oxide in the liquid phase.

DE-A-100 36 602 relates to a microreactor for reactions of gases with liquids. Several plates provided with grooves form capillaries in which the alkylene oxide is contacted with the liquid. The advantage of this reactor over DE-A-41 28 827 is the low falling-film thickness with low mass transfer resistances.

However, it has to be taken into account in this context that the alkylene oxide is in gaseous form in the reactor. Since the alkoxylation is a liquid phase reaction, there first has to be mass transfer from the gas into the liquid phase. This additional mass transport resistance undesirably lengthens the reaction time.

In addition, the presence of an alkylene oxide gas phase is problematic for safety reasons owing to possible uncontrolled decomposition.

DE-A-100 54 462 describes the continuous reaction of fatty alkoxides with alkylene oxides in plate and/or tube bundle heat exchangers under pressure. This type of reaction control is intended to substantially avoid the safety-critical gas phase of alkylene oxides and to ensure uniform product quality in continuous operation.

However, a fundamental problem of the apparatus described becomes evident in the multiple feeding of the alkylene oxides. The multiple feeds result in smaller maximum alkylene oxide concentrations being achieved in the reactor, with the aim of reducing localized overheating at the feeds, reducing the pressure and preventing localized gas phase formation.

However, the need for multiple feeds arises from the limitations of the plate and/or tube bundle heat exchangers used. Even in the plate heat exchangers which are known to be efficient heat transferers, the heat removal is not sufficient to prevent temperature peaks ("hotspots") in the case of a single feed. This is all the more true of tube bundle heat exchangers. In addition, pressure increases in both apparatus versions lead to increasingly complicated design.

The kinetic potential which arises in theory by the use of high alkylene oxide concentrations can obviously not be exhausted under these conditions.

In addition, DE-A-100 54 462 does not describe the alkylene oxide feeds in detail. It is evident from the figures and the description that there are comparatively extensive, especially poorly cooled (low specific surface area, no adjacent cooling) geometries at these feeds. Without a countermeasure, this leads to an intensification of the hotspots which would be expected in any case in the exothermic alkoxylations.

In the event of faults, for example in the event of an interruption in the product conveying, there is even the risk that the lack of cooling in the region of the mixing zones, owing to the temperature increase in this region which is then virtually adiabatic, leads to a safety problem.

Furthermore, backmixing in the plate heat exchangers causes greatly differing residence times of the individual flow threads, which leads to products having a broad molecular mass distribution.

SUMMARY OF THE INVENTION

It is therefore an object of the present invention to provide a reactor with which the potential of very high reaction rates can be exploited optimally by high alkylene oxide pressures and polyether alcohols can be prepared which have distinctly fewer by-products and a uniform quality. The term "polyether alcohol" includes a possible presence of polyether alkoxylates (polyether alkoxides). Further objects of the invention are the provision of a corresponding process which can be carried out economically and safely and the first provision of corresponding polyether alcohols of an optimally uniform and high quality.

DETAILED DESCRIPTION OF THE INVENTION

Figure 1:
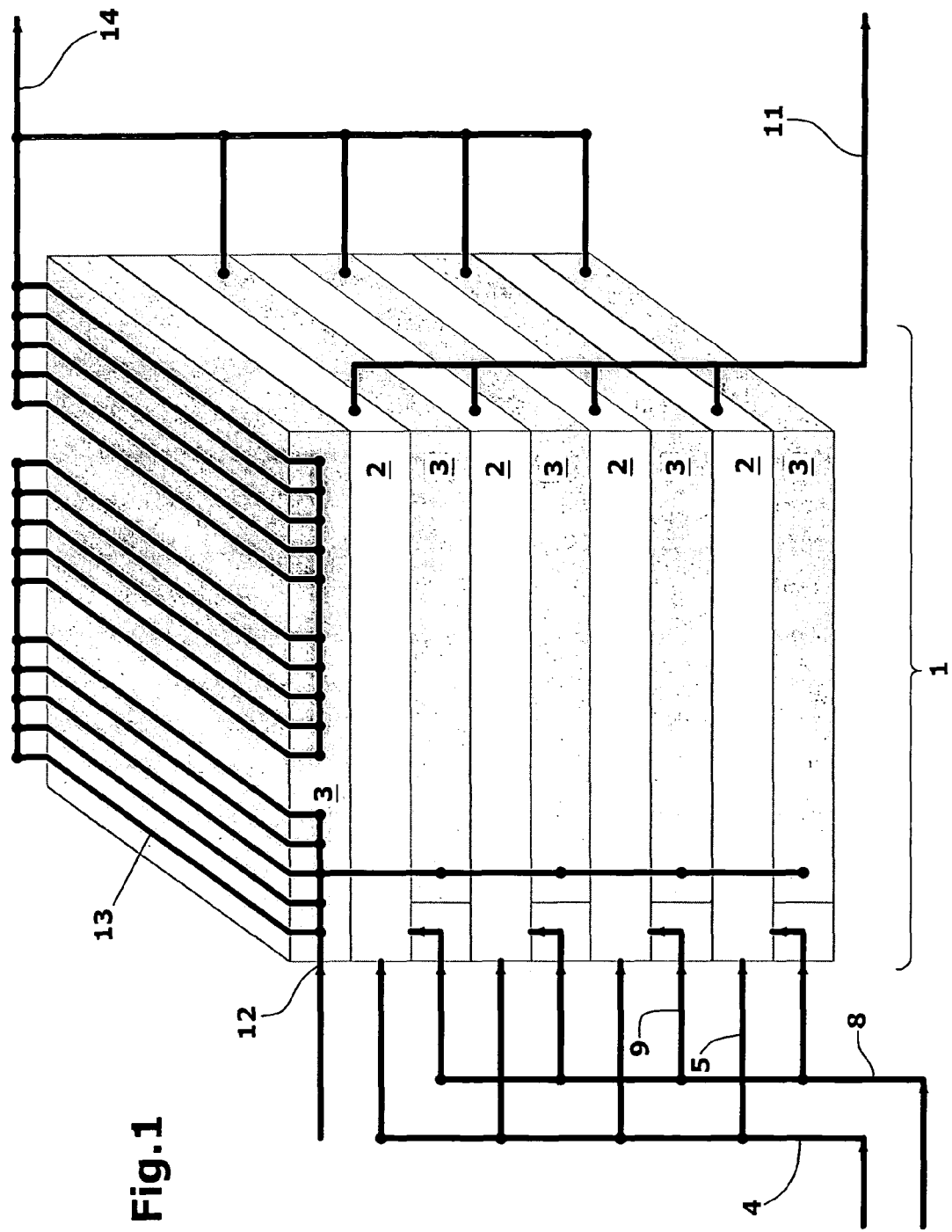
FIG. 1 is an overall view of the microstructured reactor.

The object of the invention is achieved by a microstructure reactor with parallel-connected channel arrays for carrying out chemical reactions between substantially liquid reactants, optionally in the presence of a solid catalyst, the chemical process taking place in spaces which are formed by two or more substantially plane-parallel plates or layers, wherein the reactants are mixed individually in each reaction channel in monophasic liquid form and a heat exchanger apparatus, specifically a cooling or heating apparatus, is provided, and the reactor is designed for pressures of up to 800 bar and temperatures in the range from −30° C. to 400° C.

The object of the invention is also achieved by a process for preparing polyether alcohols of the general formula (I)

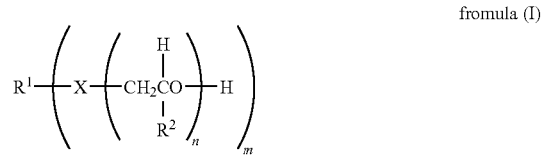

formula (I)

by alkoxylating compounds of the general formula $R^1(XR')_m$ in the microstructured reactor as described above, which comprises mixing the compound $R^1(XR')_m$ and a suitable catalyst and introducing them into the reactor, feeding thereto from 1 to 300, preferably from 2 to 150, equivalents of alkylene oxide, directly or at a plurality of points, into the reactor and mixing them with the compound $R^1(XR')_m$, catalyst and/or subsequent products thereof, reacting them in the reaction channels at a temperature in the range from 50 to 300° C. and a pressure in the range of from 1 1 to 800 bar, and subsequently cooling the product mixture, where $R^1$ in the general formula $R^1(XR')_m$ is a mono- or polyvalent organic radical, m is a corresponding integer, $R^2$ in the molecule is uniformly or differently hydrogen and/or a substituted or unsubstituted organic radical, X is O, S, NH or NR', and each R' is independently, a hydrogen, a substituted or unsubstituted organic cyclic or acyclic.

The object of the invention is also achieved by a polyether alcohol of the general formula (I)

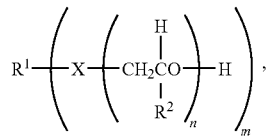

fromula (I)

obtainable by the process as claimed described above, which has a chain length n in the range of from 1 to 100 and a molecular weight distribution $M_w/M_n$ of not more than 1.20, where $R^1$ in the general formula $R^1(XR')$ m is a mono- or polyvalent organic radical, m is a corresponding integer, $R^2$ in the molecule is uniformly or differently hydrogen and/or a substituted or unsubstituted organic radical, X is O, S, NH or NR', and R' is a substituted or unsubstituted organic cyclic or acyclic.

The inventive reactor is a microstructured reactor with parallel-connected channel arrays for carrying out chemical reactions between substantially liquid reaction partners, especially for preparing polyether alcohols by alkoxylating alcohols with alkylene oxide which is liquid under the reaction conditions, optionally in the presence of a solid catalyst, the chemical process taking place in spaces which are formed by two or more substantially plane-parallel plates or layers, wherein the reactants are mixed individually in each reaction channel in monophasic liquid form and a heat exchanger apparatus, specifically a cooling or heating apparatus, is provided, and the reactor is designed for pressures of up to 800 bar and temperatures in the range from –30° C. to 400° C., in particular from –10° C. to 300° C.

A microstructured apparatus is suitable for carrying out strongly exothermic or strongly endothermic and/or mixture-sensitive reactions. For the present application, a reactor is specifically proposed in which the process medium is conducted in parallel channels which are optionally profiled and/or provided with regular alterations in the flow path (for example zig-zag pattern). The channels are preferably designed as capillaries.

The channels are manufactured preferably in a multistage process, in which the capillary structure is generated in the form of channel arrays or groove arrays in individual plates in a first step, for example by milling, etching, stamping or similar processes, and the plates are subsequently joined, for example, by (diffusion) welding or soldering. Each individual process channel is thus delimited from adjacent process capillaries.

The reactants can be mixed either without or within the reactor. In the case of mixing without the reactor, a suitable mixing unit (for example a static mixer) is connected upstream of the reactor. However, preference is given to mixing the reactants within the reactor. The reactants are contacted by combining the streams from in each case two adjacent plates. To this end, orifices are disposed in all channels of one plate, through which the streams from the channels of the other, adjacent plate are then conducted. The reactant streams from in each case one channel for reactant 1 and one channel for reactant 2 are thus combined.

Figure 2:
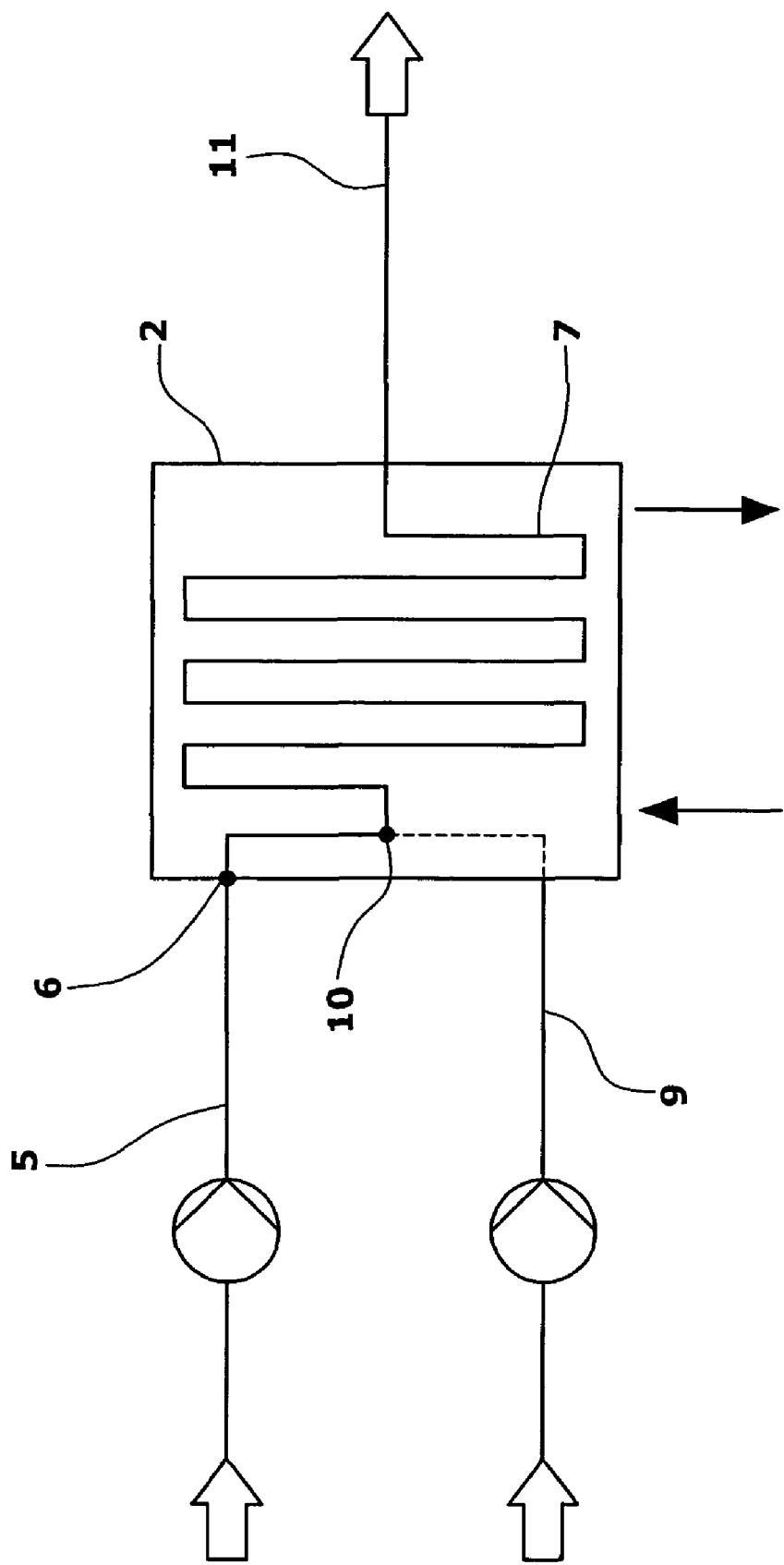
FIG. 2 is a plan view of a reactor plate 2 from FIG. 1
Figure 3:
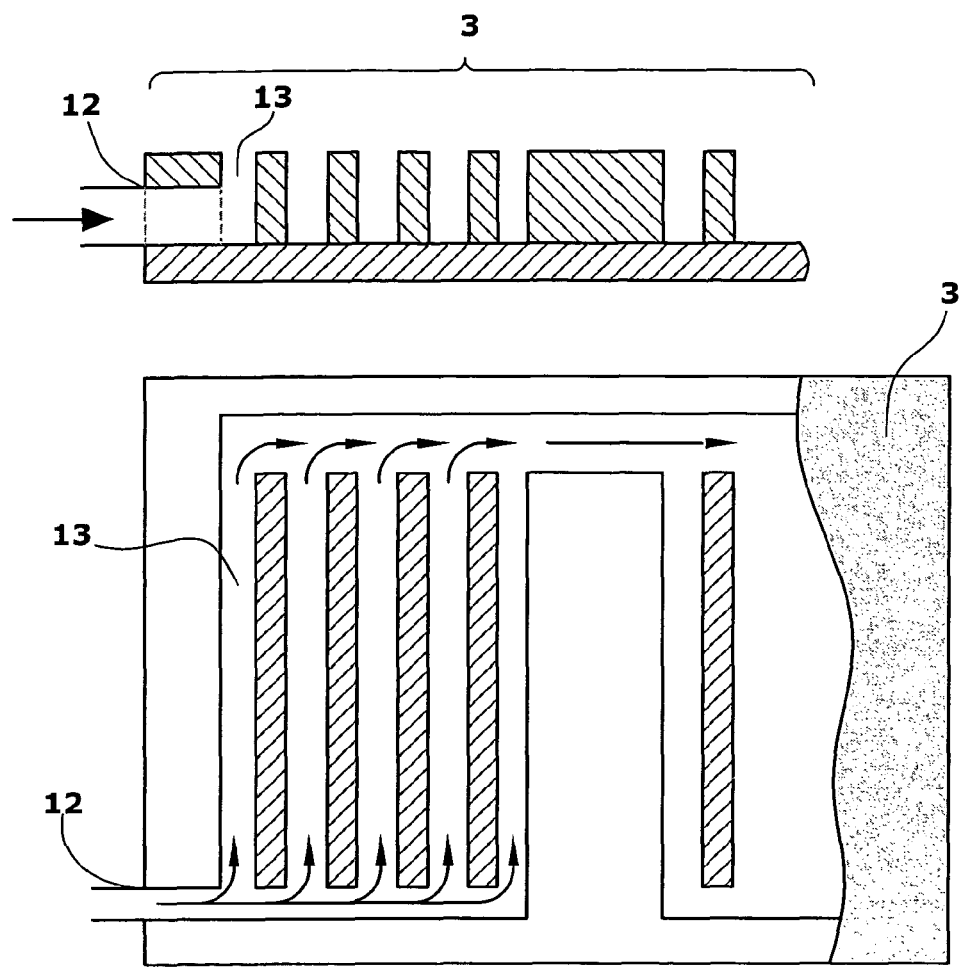
FIG. 3 is a detailed side view (above) and a plan view (below) of a cooling plate 3 from FIG. 1 with reactant feed lines 9 omitted.

FIGS. 1 to 3 show an example of a possible embodiment of the inventive reactor. FIG. 1 shows an overall view of this embodiment. The reactor 1 has plane-parallel reactor plates 2 which are enclosed on their outer principal planes and between one another by plane-parallel cooling plates 3. Instead of cooling plates, heating plates are also possible in accordance with the invention in the same way here and in all embodiments described hereinbelow by way of example. The main feed line 4 for one reaction component (reactant) fans out into in each case one feed line 5 per reactor plate, which opens directly into the inlet points 6 at the inlet of the reaction channels 7. A further main feed line 8 for a second reaction component (reactant) is disposed at the same point in the reactor and fans out correspondingly into in each case one feed line 9 per reactor plate, which is then conducted through in each case one cooling plate adjacent to the reactor plate and meets the reaction channels 7 at an inlet point 10. The reaction channels combine on the product side after leaving the reactor to the product collection 11. The cooling medium is fed in here through the inlet 12 into the particular cooling channels 13. After they have passed through the cooling plates, the cooling channels are combined and the cooling medium is removed 14.

FIG. 2 is a plan view of a reactor plate 2 from FIG. 1. The feed lines for the reactants 5 and 9 are provided here with metering pumps which regulate the reactant stream, and the part of the feed line 9 which is shown as a dotted line indicates that it is disposed in a different plane to the reactor plate 2, according to FIG. 1 within an adjacent cooling plate. The reaction channels run here in a meandering and substantially antiparallel and alternating manner.

The reactants can be combined in accordance with the invention in such a manner that the reaction mixture enters directly downstream of the mixing points into a wall-cooled region of the plate, which utilizes the known advantageous intensive heat transfer conditions in microstructures and makes it possible to conduct the reaction with negligible excessive temperature increases. The cooling channels in the cooling plate can be mounted in parallel or at right angles to the flow direction of the reaction medium, which makes possible co-, counter- and crosscurrent flow of the cooling medium. This allows flexible adjustment of the reaction temperature to the reaction requirements.

FIG. 3 shows a detailed side view (above) and a plan view (below) of an exemplary embodiment of a cooling plate 3, with reactant feed lines 9 omitted. The cooling medium enters through the inlet 12 into the cooling plate which here has a plurality of parallel cooling channels 13 which fan out at right angles to the main flow direction of the reaction medium. In the same manner, the structure of the cooling plate, especially the profile of the cooling channels, may also correspond substantially to the structure of the reactor plate and the profile of the reaction capillaries.

Figure 4:
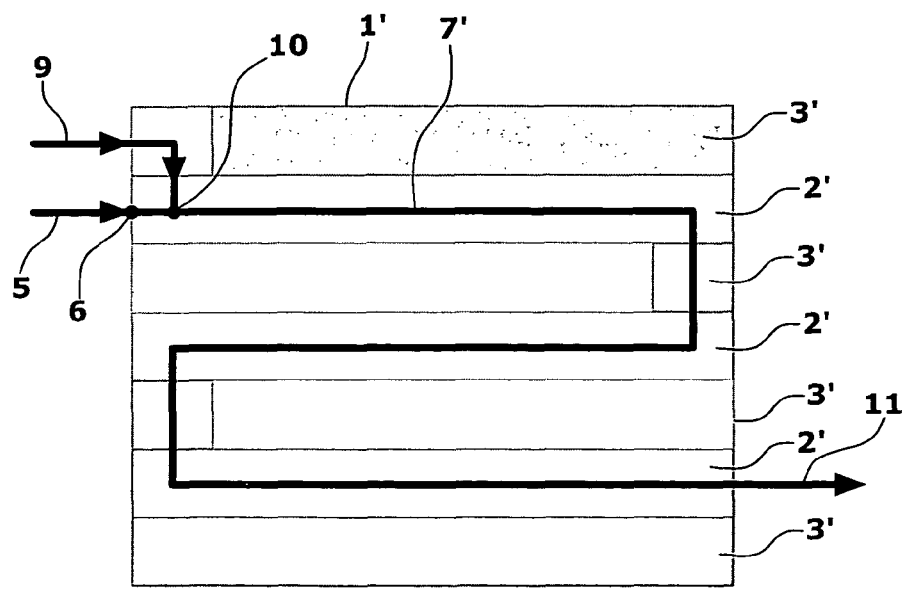
FIG. 4 is a partial side view of an embodiment of the microstructured reactor with only one reaction channel

FIG. 4 shows a side view of a further exemplary embodiment of the inventive reactor, with only one reaction channel shown for reasons of clarity. Here, the mutually parallel reaction channels 7' do not run substantially within the plane of a reactor plate 2', but rather within a plane at right angles thereto, and the reaction medium is conducted in a meandering manner within tracks alternating in an antiparallel manner, whose antiparallel sections are long relative to the parallel sections and each run in the plane of a reactor plate 2'.

Figure 5:
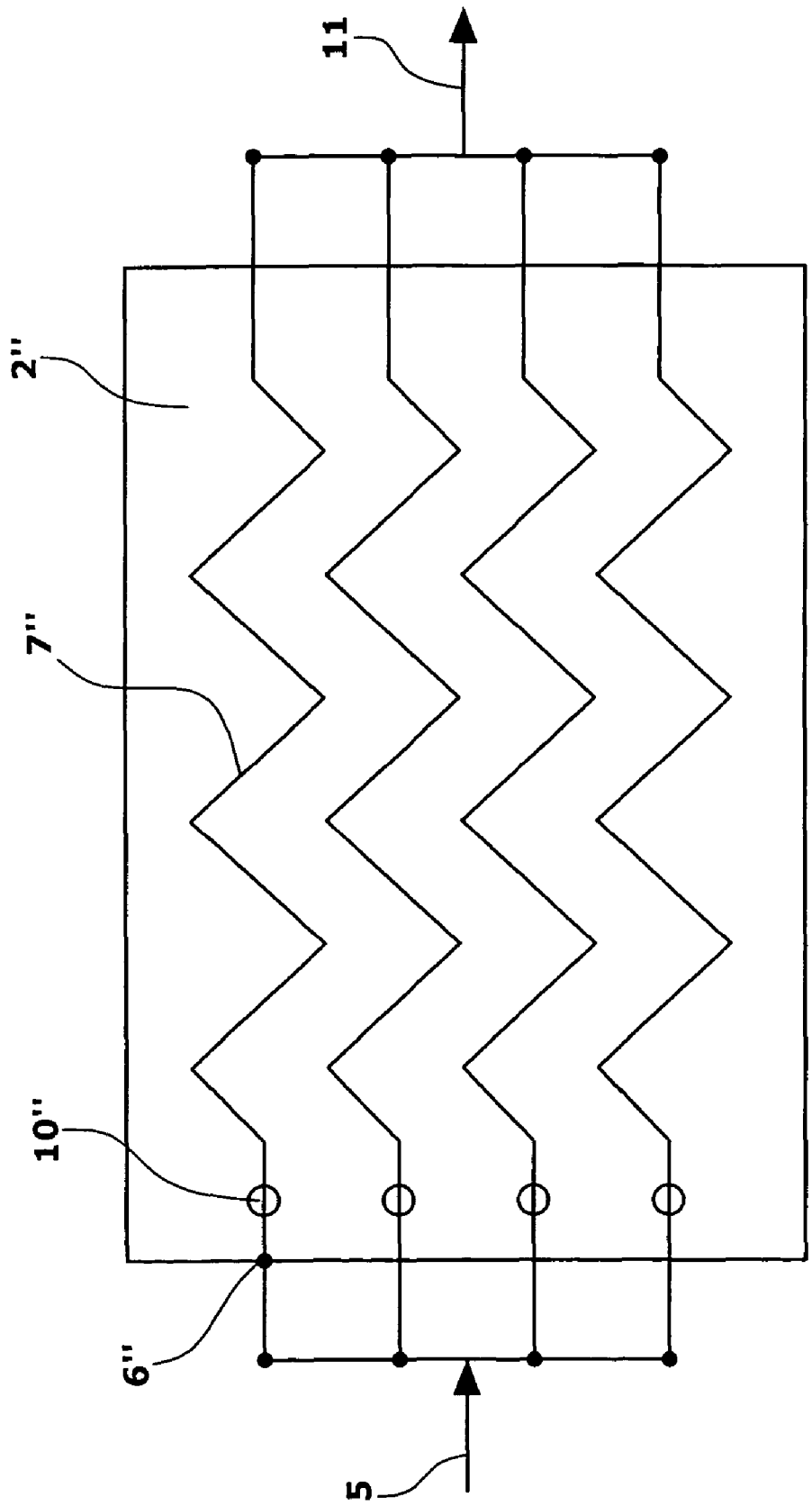
FIG. 5 is another method of conducting the reaction channel.

Another inventive means of conducting the reaction channels is illustrated by FIG. 5. The reactor plate 2" shown by way of example accommodates four reaction channels 7" which run parallel from the inlet points 6" of one reactant into the reaction plate up to the exit and in a parallel zig-zag manner from a further inlet point 10'' on, and combine on the product side to the product collection. The reactant feed lines of each reaction plate appropriately have a common feed line (feed line 5 is shown by way of example). A reactor designed in this way has the advantage that efficient reaction control is possible with high throughput and excellent mixing with a very low space requirement.

Figure 6:
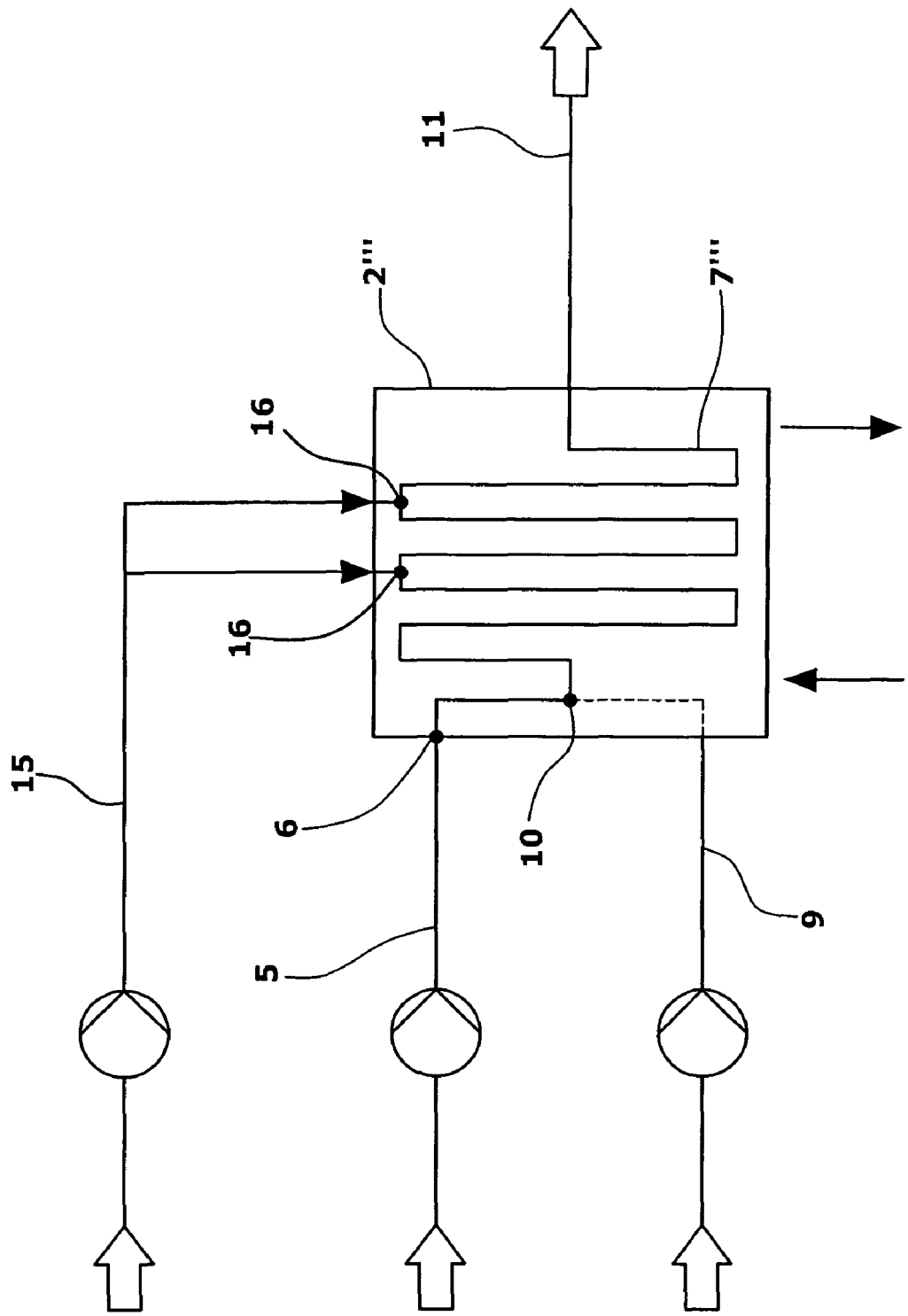
FIG. 6 is another embodiment of the microstructure reactor with a plan view of a reactor plate.

FIG. 6 illustrates one possible variant of the inventive reactor with reference to a plan view of a reactor plate. The reactor plate 2''' corresponds substantially to the reactor plate 2 (FIG. 2), with the difference that, in addition to the inlet points 6 and 10, two further inlet points 16, which are fed from a separate laterally attached reactant feed 15, for the feed of further or different reactants are provided in the course of the reaction channel 7''' within the reactor plate 2'''.

Figure 7:
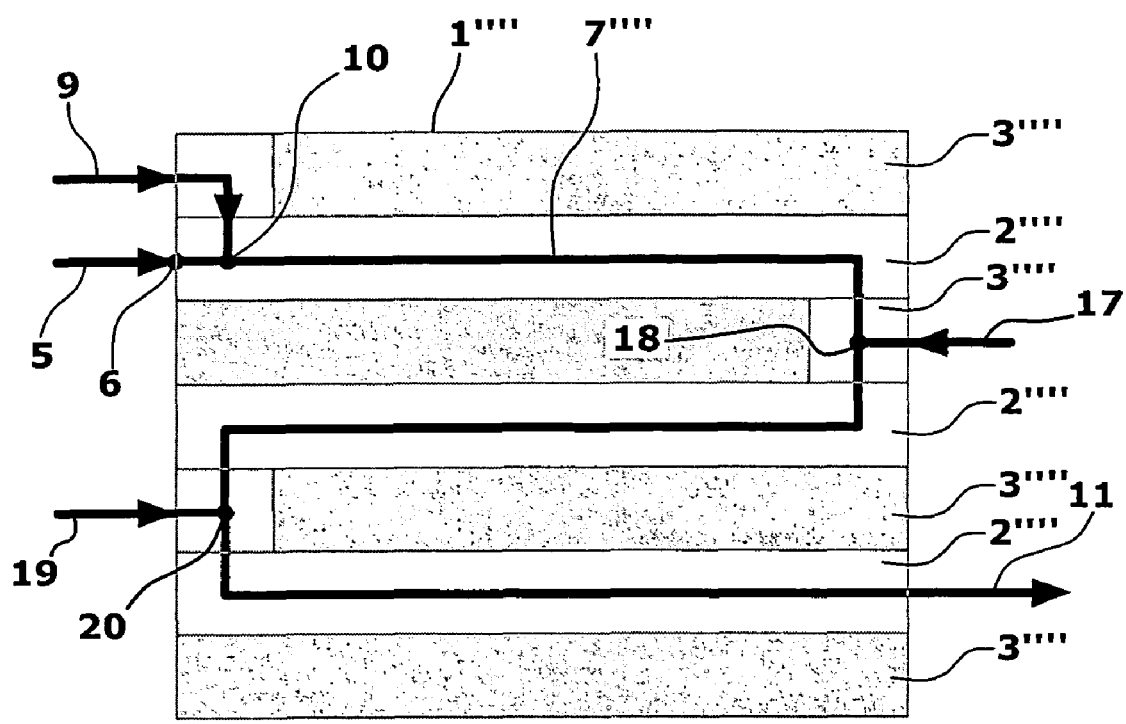
FIG. 7 is another embodiment of the microstructure reactor with reference to a side view of a reactor 1''''.

FIG. 7 illustrates a further possible variant of the inventive reactor with reference to a side view of a reactor 1''''. This corresponds substantially to the reactor 1' shown in FIG. 4 with the difference that, in addition to the inlet points 6 and 10, a further inlet point 18 fed from a separate reactant feed line 17 is provided in the course of the reaction channel 7'''' as it passes through a cooling plate 3'''', as is an additional inlet point 20 fed from a separate reactant feed line 19 as it passes through a further cooling plate 3''''. The reactants fed to the reaction through the additional inlet points may be the same as in the inlet points 6 and 10, but may also be different.

The construction described here and its embodiments overcome the problems of the prior art detailed at the outset:

Owing to the channel structure and lower hydraulic dimensions, especially also in the case of capillary structure of the reaction channels, even high pressures are comparatively simple to handle. Therefore, the reactor can be operated monophasically and even a pressure increase, caused by high alkylene oxide concentrations at the feed, within the temperature range typical of the alkoxylation may be controlled without restriction. The localized stoichiometry may thus be adjusted freely and independently of apparatus influences, and the kinetics are thus utilized in an advantageous manner, which achieves a process intensification.

If sensible/necessary for the product quality, it is also possible to use multiple feeds in this reactor design according to the above-described principle. This is the case especially when different monomers have to be added on blockwise.

A failure in the supply does not lead to any comparatively safety-critical state, since the reaction volumes which are poorly cooled if at all, owing to the low hydraulic diameter of the channels, are drastically smaller than in conventional reactors. The holdup of unconverted alkylene oxides is so small that the adiabatic temperature increase in the event of failure of the cooling in the microstructured reactor does not lead to a safety problem.

The backmixing in channel structures, especially in capillary structures, is extremely low, so that a narrow molecular mass distribution of the products is achieved. When a broad molecular mass distribution is desired, this may be achieved by additional, downstream feeds.

A further advantage of the alkoxylation in the inventive microreactor is that there is no risk in the course of scaleup. Increase, for example modular increase in the number of channels in the microstructured reactor or increase in the number of the microstructured reactors, allows the production output to be increased simply and without risk.

It is known that the mass transfer resistances are greatly reduced in the region of the critical points and that intensification of the reaction sequences occurs. The pressure-rated construction of the reactor allows pressures in the region of the critical point to be established economically and higher space-time yields to be achieved. The pressure in the inventive microstructured reactor during operation is preferably from 11 to 800 bar.

Since the reaction components are present in liquid form over the entire reaction, mass transfer inhibition is prevented, as occurs in other reactor designs, especially stirred tank reactors. This allows extremely short residence times to be achieved, which enable an increase in the reaction temperature. This surprisingly brings about a reduction of undesired side reactions. The product quality is thus improved.

The inventive microstructured reactor may therefore be designed in particular for carrying out continuous processes in the liquid phase.

For continuous operation, the inventive reactor may have a small design. In one embodiment of the invention, the reactor volume of the microreactor is between about 0.1 to 100 L; in another embodiment of the invention the reactor volume is between about 0.1 to about 1 L; in another embodiment of the invention, the reactor volume is between about 5 L to about 75 L; in yet another embodiment of the invention, the reactor volume is between about 20 L to about 40 L. This means that, for an annual production of, for example, 1500 metric tons, a reactor volume (holdup) of 24 l is sufficient. From safety aspects too, this is a great advantage over conventional reactors for preparing polyether alcohols, which in particular cannot be achieved in loop reactors. The low reactor volume additionally makes possible rapid product change, which enables the flexible preparation of a range of products with otherwise continuous operation.

The reactor may also be designed in the manner of DE-A-100 36 602, with the difference and the proviso that it is designed for carrying out chemical reactions between substantially liquid reaction partners under high pressure and at high temperatures. The reaction channels may preferably have a profiled design and/or are provided with regular changes in the flow path. In this way, optimal mixing of the reactants is achieved, which enables short residence times and narrow molecular mass distributions in the product.

The hydraulic diameter of the channels is advantageously less than 2 mm, in particular less than 1 mm, since the heat transfer to the environment is better here.

The heat exchanger apparatus is, for example, a cooling apparatus. This may advantageously comprise cooling channels in the cooling plate, in parallel or at right angles to the flow direction of the reaction medium, and the channels are preferably cooled externally with the aid of a cooling medium.

The inventive reactor may particularly advantageously provide a plurality of, in particular up to 20, more preferably up to 10, inlet points for the same or different reactants in the reaction channels. One alkylene oxide or various alkylene oxides may be metered at one or more points into the channels of the microstructured reactor. It is thus made possible to prepare oligomers and/or polymers which are pure or in a defined mixture, in which case the selection of the position and the feed of the reactants through the inlet points can influence, adjust and/or vary not only the global composition of catenated or branched polymers and/or oligomers, but in particular also the localized composition.

The process according to the invention for preparing polyether alcohols of the general formula (I)

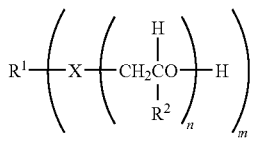

formula (I)

by alkoxylating compounds of the general formula $R^1(XR')_m$ in the microstructured reactor as described above, comprises mixing the compound $R^1(XR')_m$ and a suitable catalyst and introducing them into the reactor, feeding thereto from 1 to 300, preferably from 2 to 150, very particularly from 5 to 120 or optimally from 10 to 80 equivalents of alkylene oxide, directly or at a plurality of points, into the reactor and mixing them with the compound $R^1(XR')_m$, catalyst and/or subsequent products thereof, reacting them in the reaction capillaries at a temperature in the range from 50 to 300° C. and a pressure in the range of from 11 to 800 bar, and subsequently cooling the product mixture, where $R^1$ in the general formula $R^1(XR')_m$ is a mono- or polyvalent organic radical, m is a corresponding integer, $R^2$ in the molecule is uniformly or differently hydrogen and/or an organic radical selected from the group consisting of substituted or unsubstituted $C_1$-$C_{12}$ alkyl, $C_2$-$C_{12}$ alkenyl, phenyl, in particular $CH_3$, $C_2H_5$, phenyl, $C_{10}H_{21}$, allyloxymethyl, X is O, S, NH or NR', and R' is hydrogen, an organic cyclic, option ally substituted radical, having from 4-7 carbon atom or acyclic, optionally substituted radical, having from 1 to 26 carbon atoms, wherein the substituents are selected from the group consisting of amino, hydroxy, halogen, $C_1$-$C_4$ alkyl, $C_1$-$C_4$ alkoxy, $C_1$-$C_4$ acyl.

In one embodiment of the process, when X is O, S or NH, then R' is hydrogen.

In another embodiment of the process, when X is NR' then R' is independently selected from the group consisting of hydrogen, $C_1$-$C_{26}$ alkyl and $C_1$-$C_{26}$ acyl optionally substituted with amino or hydroxy. In a further embodiment of the invention, when X is NR' then R' is independently selected from the group consisting of hydrogen, $C_1$-$C_4$ alkyl, $C_{12}$-$C_{26}$ alkyl, $C_1$-$C_4$ acyl, $C_{12}$-$C_{26}$ acyl optionally substituted with amino or hydroxy.

The alkylene oxide may thus be composed of single, or else of a mixture of different, monomers.

The reaction may preferably be operated continuously. For instance, it is possible to achieve particularly short residence times of the reactants and the product in the reactor, which lead to particularly high product purity, product uniformity and narrow molecular mass distribution. It has been possible using the inventive reactor in the process according to the invention in continuous operation to prepare, for example, polyethylene oxides and polypropylene oxides in pure white form, in contrast to brown or brownish product which is achieved by batchwise operation of conventional processes.

The residence time of the reaction mixture in the reaction channels is preferably from about 1 to about 600 s, in particular from about 50 to about 400 s, very particularly from about 100 to 300 s. Depending on the catalyst content and reaction temperature, shorter residence times have the disadvantage that the reaction possibly does not proceed to completion, while longer residence times can lead to product contaminations, discolorations and less uniform products, especially with regard to the molecular mass distribution.

The reaction temperature in the reaction capillaries is more preferably selected within the range from about 80 to about 200° C., in particular from about 120 to about 200° C.; particular preference is also given to a reaction temperature in the range from about 185° C. to about 195° C. This achieves firstly a sufficiently high reaction rate and high reaction conversion, which contributes to shortening the residence times in the reactor and obtaining the products free of reactants, and, secondly, possibly disruptive side reactions, especially a decomposition of the products which occurs at excessively high temperature, are avoided.

A pressure in the reaction channels in the range from about 11 to about 800 bar, preferably from about 40 to about 500 bar, more preferably from about 60 to about 180 bar, ensures that the alkylene oxide is in liquid form even at elevated temperature. In addition, high pressure promotes the reaction rate and the conversion, and also the mixing, of the reactants. Nevertheless, the pressure should not exceed 800 bar for safety reasons, in order to enable economic operation.

Even though a multitude of different epoxide ring-opening starter compounds $R^1(XR')_m$ is conceivable and is provided by the invention, it is particularly preferred that m is from 1 to 8, more preferably 1 to 4, and even more preferably 1, and X is O.

Greatest preference for starter compounds of $R^1(XR')_m$ is therefore given to mono- or polyhydric alcohols such as alkenyl alcohols, alkyl alcohols, diols, polyols, ether alcohols, polyether alcohols, fatty alcohols, especially alkylene alcohols and/or alkyl alcohols where XR' is OH and $R^1$ is the corresponding organic radical, which is optionally substituted by OH. In an embodiment of the invention, $R^1$ is a $C_1$-$C_{26}$ alkyl, $C_2$-$C_{26}$ alkenyl or is a polymer formed from —$CH_2CH_2$—O— or —$CH_2CH_2CH_2$—O monomers. In a further embodiment of the invention, these alcohols include $C_2$-$C_8$-alkenyl alcohols, $C_1$-$C_8$ alcohols, $C_1$-$C_8$ alkyl diols, $C_1$-$C_8$ alkyl triols, $C_2$-$C_8$ ether alcohols and $C_{12}$-$C_{26}$ fatty alcohols. Important species are allyl alcohol, butanol, ether alcohols, polyether alcohols, glycerol, propylene glycols, ethylene glycols, trimethylolpropane, polyols, natural and synthetic fatty alcohols. However, it is also advantageously possible additionally or alternatively to use fatty acids, phosphoric esters and/or phosphoric acids. In these embodiments, m is in an integer of from 1 to 10, more preferably 1 to 3.

In the case that X is NR', particular preference is given to compounds where $R^1(XR')_m$ represents alkoxylating ethylenediamine, triethanolamine, fatty amines and/or amides.

Examples of alkylene oxides to be used particularly advantageously in accordance with the invention include $C_2$-$C_{12}$-alkylene oxides, optionally substituted with a $C_1$-$C_4$ alkenyloxy, and phenyl $C_2$-$C_{12}$-alkylene oxides. Examples include ethylene oxide, propylene oxide, but also other epoxides such as butylene oxide, styrene oxide, dodecene oxide, allyl glycidyl ether and mixtures thereof.

In the process according to the invention, preference is given to using the catalyst in an amount of from about 0.001 to about 30% by weight, based on the amount of the compound of the general formula $R^1(XR')_m$. The catalyst is in particular a base, for example an alkali metal methoxide and/or an alkali metal hydroxide. The bases used may even more preferably be alkali metal methoxides, salts or metal hydroxides, of which greatest preference is given to sodium hydroxide and potassium hydroxide, and also to sodium methoxide and potassium methoxide. In this case, preference is given to using from about 0.01 to about 30% by weight, in particular from about 1 to about 15% by weight, based on the amount of the compound of the general formula $R^1(XR')_m$. In addition, the catalyst used may be an organometallic compound, for example one or more bimetallic compounds such as Zn—Co and/or Zn—Fe catalysts, or else an acid. In this case, preference is given to using from about 0.001 to about 10% by weight, in particular from about 0.01 to about 3% by weight, based on the amount of the compound of the general formula $R^1(XR')_m$. In that case, the reaction does not proceed via the alkoxide, but rather via another mechanism.

Polyether alcohols and polyether alkoxylates(polyalkoxylates) refer in the context of the invention to oligomers and polymers which are formed by polyaddition of alkylene oxide to alkoxides or alcohols and base, or subsequent products thereof. Subsequent products of the alcohols or of the alkoxides or of the base are primarily those compounds which are formed by single or multiple addition of alkylene oxide to alkoxides and the base used. When the corresponding acid of the base has been removed before the reaction with alkylene oxides, no subsequent products of the base are formed. Depending on the requirement and starter alcohol, the corresponding acid of the base used may be removed and the alkoxide of the starter alcohol may thus be formed, or else it may remain in the system. In that case, the base takes part in the alkoxylation reaction.

The catalyst may be dissolved in the starter alcohol or in a suitable solvent or, depending on the concentration, preferably be used as a suspension. This makes it possible to make available a large amount of catalyst. This achieves a high and uniform reaction rate, which leads, in combination with good heat removal with avoidance of temperature peaks ("hotspots") to a high purity of the products. This is manifested, among other ways, in that polyether alcohols prepared in accordance with the invention are substantially white or colorless.

The process according to the invention provides, for example, that the alkylene oxide or the alkylene oxides are added in the entire amount in the first inlet point at the start of the reaction into the reaction chamber of the reactor, the reaction channels, without this resulting in the occurrence of difficulties customary in the prior art, for example hotspots (monofeed variant). There is thus no need to distribute the addition to a plurality of inlet points.

However, it is also possible regardless of this to feed the alkylene oxide or the alkylene oxides into the reaction capillaries through one or more further, especially up to a total of 20, even more preferably up to a total of 10, inlet points (multifeed variant). In this way, it is possible to influence or define the structure of the polyether alcohol chains, especially blockwise.

In a similar manner, the invention also includes the feeding of the same or different compounds $R^1(XR')_m$, preferably one or various alcohols or $R^1(XR')_m$-catalyst mixtures, preferably in the form of one or more suspensions, via various inlet points at various positions in the reaction channels or in the reaction chamber. In this way, it is possible, inter alia, to control the structure and in particular the molecular mass distribution of the products.

It is possible using the process according to the invention in the inventive reactor in particular to prepare polyether alcohols of high uniformity and purity. Inventive polyether alcohols are therefore preferably those of the general formula (I)

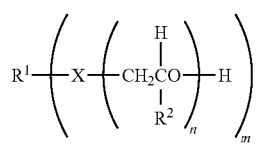

fromula (I)

which feature a chain length n in the range from 1 to 200, preferably from 5 to 150, and a molecular weight distribution $M_w/M_n$ of not more than 1.20, preferably not more than 1.08, even more preferably not more than 1.06, where $R^1$ in the general formula $R^1(XR')_m$ is a mono- or polyvalent organic radical, m is a corresponding integer, $R^2$ in the molecule is uniformly or differently hydrogen and/or an organic radical selected from the group consisting of substituted or unsubstituted $C_1$-$C_{12}$ alkyl, $C_2$-$C_{12}$ alkenyl, phenyl, in particular $CH_3$, $C_2H_5$, phenyl, $C_{10}H_{21}$, allyloxymethyl, X is O, S, NH or NR', and R' is hydrogen, an organic cyclic, optionally substituted radical, having from 4-7 carbon atom or acyclic, optionally substituted radical, having from 1 to 26 carbon atoms, wherein the substituents are selected from the group consisting of amino, hydroxy, halogen, $C_1$-$C_4$ alkyl, $C_1$-$C_4$ alkoxy, $C_1$-$C_4$ acyl.

In one embodiment of the invention, the degree of purity which can be achieved via the microreactor and process of using thereof is an alkylene oxide level in the polyether alcohol or polyether alkoxylate final product formed is less that about 100 ppm. In another embodiment of the invention, the alkylene oxide level is less than about 50 ppm. In yet another embodiment of the invention, the alkylene oxide level is less than about 10 ppm. In yet another embodiment of the invention, the alkylene oxide is ethylene oxide or propylene oxide. The inventive polyether alcohols may preferably have an ethylene oxide content in the product which is less than 10 ppm.

One surprising advantage of the invention is that up to about 100 alkylene oxide units, in particular ethylene oxide units, can be integrated in accordance with the invention for the first time into a polyether alcohol chain of high uniformity and purity. In the prior art, this was possible continuously up to a chain length of only 20 units. In another embodiment of the invention, the final products of the invent ion have an average chain length (n) of up to about 25 to about 90 and in yet a further embodiment of the invention, the final products of the invention have an average chain length (n) of about 35 to about 65.

Another surprising advantage of the invention is the high conversion rate of the process of the invention, i.e. the ratio of alcohol/base to alkylene oxide generally correlates to the chain length (n), e.g. a 1:35 alcohol/base to alkylene oxide ratio resulted in (converted into) an average chain length of 35 (see Example 3 below). In one embodiment of the invention, the conversion rate is at least about 99.2%. In another embodiment of the invention, the conversion rate is at least about 97.0%. In another embodiment of the invention, the conversion rate is at least about 94.0%.

One way in which the purity of the inventive products shows itself is that they can be obtained substantially colorless (white) without further purification steps, while polyether alcohols prepared in a conventional manner, in the alkaline state, always have a yellowish to brownish coloration which can be removed only by costly and inconvenient product purification.

EXAMPLES

The invention will now be further described by way of the following non-limiting examples.

Example 1a

FIGS. 1 to 3 show an inventive reactor which will serve as an example of a reactor for the "monofeed" process.

A microreactor 1 was manufactured from V2A stainless steel and had four plane-parallel reactor plates 2 which were enclosed at their outer principal planes and between one another by a total of five plane-parallel cooling plates 3. On one side, the reactor had a main feed line 4, provided with a metering pump, for liquid alkylene oxide, each of which fanned out into one feed line 5 per reactor plate, which opens directly into the inlet points 6 at the inlet of the reaction capillaries 7. A further feed line 8, provided with a metering pump, for the alcohol was disclosed at the same point in the reactor and fanned out correspondingly into in each case one feed line 9 per reactor plate, which were then conducted through in each case one cooling plate adjacent to the reactor plate and met the reaction capillaries 7 at an inlet point 10. The reaction capillaries had a hydraulic diameter of 600 µm and ran in a substantially meandering, antiparallel, alternating manner as shown in FIG. 1 and combined on the product side after exiting the reactor to the product collection 11. The cooling was effected in the microreactor described using a cooling medium (Marlotherm®) which was fed through the inlet 12 into the particular cooling channels 13 which were mounted at right angles to the main flow direction of the reaction medium. After they had passed through the cooling plates, the cooling channels were combined and the cooling medium was removed 14.

Not shown in the figures are temperature- and pressure-measuring and -regulating apparatus that the reactor had.

Example 1b

The reactor corresponded substantially to the reactor of Example 1a, with the difference that, as shown in FIG. 4, the mutually parallel reaction capillaries 7' do not run substantially within the plane of a reactor plate 2', but rather within a plane at right angles thereto, and the reaction medium is conducted in a meandering manner in tracks which alternate in an antiparallel manner, whose antiparallel sections are long relative to the parallel sections and each run in the plane of a reactor plate 2'. FIG. 4 shows merely one reaction capillary. However, an array of four parallel reaction capillaries was designed.

Example 1c

The reactor corresponded substantially to the reactor of Example 1a, with the difference that a reactor plate 2", as shown in FIG. 5, accommodated four reaction capillaries 7" which ran in a parallel zig-zag manner from the alcohol inlet point and combined on the product side to the product collection. In this reactor too, when the reaction capillaries, and thus the reaction volume and the reaction time, were shorter and the cooling surface was smaller than in the reactor of Example 1a, this reactor had the advantage that efficient reaction control is possible with high throughput and excellent mixing even at a very low space requirement.

Example 2a

A variant of a reactor for the "multifeed" process is shown in FIG. 6. It corresponded substantially to the reactor of Example 1a with the difference that, in addition to the inlet points 6 and 10, two further feed points 16, which were fed from a separate laterally attached reactant feed 15, for the feed of further or different reactants, i.e. alkylene oxide and/or alcohol, were provided in the course of the reaction capillaries 7''' within the reactor plates 2'''.

Example 2b

A further variant of a reactor for the "multifeed" process is shown in FIG. 7. It corresponded substantially to the reactor of Example 1b with the difference that, in addition to the inlet points 6 and 10, a further inlet point 18 fed from a separate alkylene oxide feed line 17 was provided in the course of the reaction capillaries 7'''' as it passed through a cooling plate 3'''', as was an additional inlet point 20 fed from a separate alcohol feed line 19 as it passed through a further cooling plate 3'''. The additional inlet points allowed the same reactants to be fed to the reaction in the inlet points 6 and 10, but also different reactants.

Example 3

Initially, a mixture of butanol and potassium methoxide was prepared, so that a suspension was formed which contains 3 mol % of KOMe, in which the catalyst was partly in dissolved form. This mixture was pumped continuously into the reactor described in Example 1a in a ratio of 1:35 with simultaneous feeding of ethylene oxide. The residence time was 200 seconds; the heat exchanger temperature was set to 190° C. The pressure in the reactor was 120 bar. The product leaving the reactor, after a short delay zone, was cooled to 50° C. and introduced into a collecting vessel under reduced pressure. In the course of this, residual amounts of ethylene oxide were removed. The resulting solid product was purely white, the EO content less than 10 ppm; the molecular weight distribution was $M_w/M_n=1.06$ at an average chain length of n=35. The conversion was 99.6%. No vinyl ether was formed.

Example 4

As described in Example 3, a suspension of butanol and 10 mol % of KOMe was pumped continuously into the reactor of Example 1a with simultaneous feeding of ethylene oxide in a ratio of 1:65. The residence time was 200 seconds; the heat exchanger temperature was set to 150° C. The pressure in the reactor was 120 bar. The product leaving the reactor, after a short delay zone, was cooled to 50° C. and introduced into a collecting vessel under reduced pressure. The resulting solid product was purely white, the ethylene oxide (EO) content less than 10 ppm; the molecular weight distribution was $M_w/M_n=1.1$ at an average chain length of n=65. The conversion was 99.2%. No vinyl ether was formed.

Example 5

As described in Example 1, a suspension of butanol and 5 mol % of KOMe was pumped continuously into the reactor with simultaneous metering of propylene oxide in a ratio of 1:9. The residence time was 300 seconds; the heat exchanger temperature was set to 150° C. The pressure in the reactor was 100 bar. The product leaving the reactor, after a short delay zone, was cooled to 50° C. and introduced into a collecting vessel under reduced pressure. The resulting liquid product was light-colored to slightly brownish, the propylene oxide (PO) content less than 10 ppm; the molecular weight distribution was $M_w/M_n=1.2$. The conversion was 97.5%.

Example 6

As described in Example 1, a suspension of butanol and 5 mol % of KOMe was pumped continuously into the reactor with simultaneous metering of propylene oxide in a ratio of 1:12. The residence time was 300 seconds; the heat exchanger temperature was set to 150° C. The pressure in the reactor was 100 bar. The product leaving the reactor, after a short delay zone, was cooled to 50° C. and introduced into a collecting vessel under reduced pressure. The resulting liquid product was light-colored to slightly brownish, the propylene oxide (PO) content less than 10 ppm; the molecular weight distribution was $M_w/M_n=1.25$. The conversion was 97%.

Having thus described in detail various embodiments of the present invention, it is to be under stood that the invention defined by the above paragraphs is not to be limited to particular details set forth in the above description as many apparent variations thereof are possible without departing from the spirit or scope of the present invention.

What is claimed is:

1. A process for preparing polyether alcohols of the general formula (I)

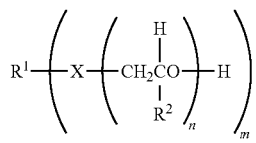

fromula (I)

by alkoxylating compounds of the general formula $R^1(XR')_m$ in a microstructured reactor with parallel-connected channel arrays for carrying out chemical reactions between substantially liquid reactants, optionally in the presence of a solid catalyst, the chemical process taking place in spaces which are formed by two or more substantially plane-parallel plates or layers, wherein the reactants are mixed individually in each reaction channel in monophasic liquid form and a heat exchanger apparatus, specifically a cooling or heating apparatus, is provided, and the reactor is designed for pressures of up to about 800 bar and temperatures in the range from —about 30° C. to about 400° C., wherein the hydraulic diameter of the channels is less than 2 mm;

which comprises mixing the compound $R^1(XR')_m$ and a suitable catalyst and introducing them into the reactor, feeding thereto a number of equivalents of alkylene oxide selected from the group consisting of from about 1 to about 300 and from about 2 to about 150, directly or at a plurality of points, into the reactor and mixing them with the compound $R^1(XR')_m$, catalyst and/or subsequent products thereof, reacting them in the reaction channels at a temperature in the range from 50 to 300° C. and a pressure in the range of from 11 to 800 bar, and subsequently cooling the product mixture, where $R^1$ is a mono- or polyvalent organic radical, m is a an integer of from 1 to 10, n is an integer from 1 to 200, $R^2$ in the molecule is uniformly or differently hydrogen and/or a substituted or unsubstituted organic radical, X is O, S, NH or NR', and each R' is independently, a hydrogen, a substituted or unsubstituted organic cyclic or acyclic wherein the residence time of the reaction mixture in the reaction channel is selected from the group of times consisting of from about 1 to about 600 seconds, from about 50 to about 400 seconds and from about 100 to about 300 seconds.

2. The process as claimed in claim 1, which is operated continuously.

3. The process as claimed in claim 1, wherein the reaction temperature in the reaction channels is selected from the group of temperature ranges consisting of from about 80 to about 200° C. and from about 120 to about 200° C.

4. The process as claimed in claim 1, wherein the pressure in the reaction channels is selected from group of pressure ranges consisting of from about 40 to about 500 bar and from about 60 to about 180 bar.

5. The process as claimed in claim 1, wherein X is O.

6. The process as claimed in claim 5, wherein alkylene alcohols and/or alkyl alcohols, are used.

7. The process as claimed in claim 5, wherein fatty acids, phosphoric esters and/or phosphoric acids are used.

8. The process as claimed in claim 1, wherein X is NR'.

9. The process as claimed in claim 1, wherein the alkylene oxide is ethylene oxide, propylene oxide, butylene oxide, styrene oxide, dodecene oxide and/or allyl glycidyl ether.

10. The process as claimed in claim 1, wherein the catalyst is used in an amount of from 0.001 to 30% by weight, based on the amount of the compound of the general formula $R^1(XR')_m$.

11. The process as claimed in claim 10, wherein the catalyst is selected from the group consisting of a base, an alkali metal methoxide and an alkali metal hydroxide.

12. The process as claimed in claim 11, wherein the catalyst is used in an amount selected from the group of weight ranges consisting of from about 0.01 to about 30% by weight and from about 1 to about 15% by weight, based on the amount of the compound of the general formula $R^1(XR')_m$.

13. The process as claimed in claim 10, wherein the catalyst is selected from the group consisting of an acid, an organometallic compound and a bimetallic compound.

14. The process as claimed in claim 13, wherein the catalyst is used in an amount selected from the group of weight ranges consisting of from about 0.001 to about 10% by weight, and from about 0.01 to about 3% by weight, based on the amount of the compound of the general formula $R^1(XR')_m$.

15. The process as claimed in claim 1, wherein alkylene oxide, different alkylene oxides and/or mixtures of different alkylene oxides are fed to the reaction capillaries through a number range of inlet points selection from the group consisting of one or more inlet points and up to 20 inlet points.

16. The process of claim 1, wherein the process comprises mixing the compound $R^1(XR')_m$ and a suitable catalyst and introducing them into the reactor, feeding thereto a range of equivalents of alkylene oxide selected from the group consisting of from about 5 to about 120 and from about 10 to about 80, directly or at a plurality of points, into the reactor and mixing them with the compound $R^1(XR')_m$, catalyst and/or subsequent products thereof, reacting them in the reaction capillaries at a temperature in the range from 50 to 300° C. and a pressure in the range of from 11 to 800 bar, and subsequently cooling the product mixture, where $R^1$ is a mono- or polyvalent organic radical, m is an integer of from 1 to 10, n is an integer from 1 to 200, $R^2$ is uniformly or differently hydrogen and/or an organic radical selected from the group consisting of substituted or unsubstituted $C_1$-$C_{12}$ alkyl, $C_2$-$C_{12}$ alkenyl, phenyl, $CH_3$, $C_2H_5$, phenyl, $C_{10}H_{21}$, and allyloxymethyl, X is O, S, NH or NR', and R' is hydrogen, an organic cyclic, optionally substituted radical, having from 4-7 carbon atom or acyclic, optionally substituted radical, having from 1 to 26 carbon atoms, wherein the substituents are selected from the group consisting of amino, hydroxy, halogen, $C_1$-$C_4$ alkyl, $C_1$-$C_4$ alkoxy and $C_1$-$C_4$ acyl.

17. The process of claim 15, wherein the process comprises mixing the compound $R^1(XR')_m$ and a suitable catalyst and introducing them into the reactor, feeding thereto a range of equivalents of alkylene oxide selected from the group consisting of from about 5 to about 120 and from about 10 to about 80, directly or at a plurality of points, into the reactor and mixing them with the compound $R^1(XR')_m$, catalyst and/or subsequent products thereof, reacting them in the reaction capillaries at a temperature in the range from 50 to 300° C. and a pressure in the range of from 11 to 800 bar, and subsequently cooling the product mixture, where $R^1$ is a mono- or polyvalent organic radical, m is an integer of from 1 to 10, n is an integer from 1 to 200, $R^2$ is uniformly or differently hydrogen and/or an organic radical selected from the group consisting of substituted or unsubstituted $C_1$-$C_{12}$ alkyl, $C_2$-$C_{12}$ alkenyl, phenyl, $CH_3$, $C_2H_5$, phenyl, $C_{10}H_{21}$, and allyloxymethyl, X is O, S, NH or NR', and R' is hydrogen, an organic cyclic, optionally substituted radical, having from 4-7 carbon atom or acyclic, optionally substituted radical, having from 1 to 26 carbon atoms, wherein the substituents are selected from the group consisting of amino, hydroxy, halogen, $C_1$-$C_4$ alkyl, $C_1$-$C_4$ alkoxy and $C_1$-$C_4$ acyl.

18. The process as claimed in claim 1, wherein the residence time of the reaction mixture in the reaction channel is from about 100 to about 300 seconds and the reaction temperature in the reaction channel is from about 120 to about 200° C.

19. The process as claimed in claim 1, wherein the residence time of the reaction mixture in the reaction channel is from about 100 to about 300 seconds and the reaction temperature in the reaction channel is from about 185 to about 195° C.

20. The process as claimed in claim 1, wherein the polyether alcohols of general formula (I) have a molecular weight distribution $M_w/M_n$ of not more than 1.25.

21. The process as claimed in claim , wherein the hydraulic diameter of the channels is less than 1 mm.

22. The process as claimed in claim 20, wherein $M_w/M_n$ is not more than 1.25, the ethylene oxide content of the polyether alcohol is less than 10 ppm, n is 25 to 90 and the conversion rate of the process is at least about 97%.

* * * * *